(12) United States Patent
Djenguerian et al.

(10) Patent No.: US 8,035,254 B2
(45) Date of Patent: *Oct. 11, 2011

(54) METHOD AND APPARATUS FOR INTEGRATED CABLE DROP COMPENSATION OF A POWER CONVERTER

(75) Inventors: Alex B. Djenguerian, Saratoga, CA (US); Erdem Bircan, San Carlos, CA (US)

(73) Assignee: Power Integrations, Inc., San Jose, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 12/058,526

(22) Filed: Mar. 28, 2008

(65) Prior Publication Data

US 2008/0246447 A1 Oct. 9, 2008

Related U.S. Application Data

(60) Provisional application No. 60/922,193, filed on Apr. 6, 2007.

(51) Int. Cl.
*G05F 1/10* (2006.01)
(52) U.S. Cl. .......................... 307/103; 307/130
(58) Field of Classification Search .................. 307/103, 307/130
See application file for complete search history.

(56) References Cited

U.S. PATENT DOCUMENTS

| | | | |
|---|---|---|---|
| 4,660,136 A | 4/1987 | Montorefano | |
| 5,305,192 A | 4/1994 | Bonte et al. | |
| 5,499,184 A | 3/1996 | Squibb | |
| 5,841,463 A | 11/1998 | Debesis et al. | |
| 6,069,807 A | 5/2000 | Boylan et al. | |
| 6,125,048 A * | 9/2000 | Loughran et al. | 363/78 |
| 6,163,136 A * | 12/2000 | Celenza | 320/164 |
| 6,233,161 B1 | 5/2001 | Balakrishnan et al. | |
| 6,370,039 B1 | 4/2002 | Telefus | |

(Continued)

FOREIGN PATENT DOCUMENTS

DE 10218344 7/2003

(Continued)

OTHER PUBLICATIONS

Modern Dictionary of Electronics, Seventh Edition, Rudolf F. Graf, copyright 1999, Newnes, an imprint of Butterworth-Heinemann, a member of the Reed Elsevier Group. ISBN 0-7506-9866-7. p. 381, definition of "integrated circuit".*

(Continued)

*Primary Examiner* — Fritz M Fleming
(74) *Attorney, Agent, or Firm* — Blakely Sokoloff Taylor & Zafman LLP (57) ABSTRACT

An integrated circuit controller for a power converter to be coupled to a distribution network is disclosed. An example integrated circuit controller according to aspects of the present invention includes a switching control circuit that outputs a drive signal to control switching of a switch to regulate an output of the power converter. The integrated circuit controller also includes a cable drop compensator that outputs a compensated reference voltage signal to the switching control circuit in response to a switching signal. The switching signal is responsive to the drive signal. The compensated reference voltage signal is representative of a voltage value that is responsive to a distribution voltage across the distribution network and a load voltage across a load to be coupled to the distribution network. The switching of the switch is responsive to the compensated reference voltage signal and a feedback signal.

19 Claims, 11 Drawing Sheets

U.S. PATENT DOCUMENTS

| | | | |
|---|---|---|---|
| 6,385,059 | B1 | 5/2002 | Telefus et al. |
| 6,396,725 | B1 | 5/2002 | Jacobs et al. |
| 6,434,021 | B1 | 8/2002 | Collmeyer et al. |
| 6,480,399 | B2 | 11/2002 | Balakrishnan et al. |
| 6,900,995 | B2 | 5/2005 | Muegge et al. |
| 6,990,000 | B1 | 1/2006 | Rodriguez et al. |
| 7,259,972 | B2 | 8/2007 | Yang |
| 7,352,595 | B2 | 4/2008 | Yang et al. |
| 7,359,222 | B2 | 4/2008 | Mayell et al. |
| 7,463,497 | B2 | 12/2008 | Negrete |
| 7,570,500 | B2 | 8/2009 | Mayell et al. |
| 2002/0057080 | A1 | 5/2002 | Telefus et al. |
| 2003/0002354 | A1 | 1/2003 | Schroegmeier et al. |
| 2003/0048126 | A1 | 3/2003 | Watarai |
| 2003/0128018 | A1 | 7/2003 | Telefus et al. |
| 2004/0257839 | A1 | 12/2004 | Yang et al. |
| 2007/0103134 | A1* | 5/2007 | Yang et al. ............ 323/282 |
| 2008/0157739 | A1 | 7/2008 | Mayell et al. |
| 2008/0246447 | A1 | 10/2008 | Djenguerian et al. |
| 2010/0164443 | A1* | 7/2010 | Tumminaro et al. ......... 323/247 |
| 2010/0181840 | A1* | 7/2010 | Coulson et al. ............. 307/103 |

FOREIGN PATENT DOCUMENTS

| | | |
|---|---|---|
| EP | 1 278 284 | 1/2003 |

OTHER PUBLICATIONS

EP 06 25 4779—European Search Report and Written Opinion, dated Nov. 23, 2009. (11 pages).

Bindra, A., "Power Supply Controller Keeps Efficiency High Across All Loads: Using digital regulation, this power controller yields high performance at low loads with unconditional stability," Analog, Power Devices & DSP, Electronic Design, Dec. 3, 2001, pp. 50-52.

iWatt, "iW2201—Digital SMPS Controller: Preliminary Data," Revision 1.1, pp. 1-13.

iWatt, "iW2202—Digital SMPS Controller: Preliminary Data," Revision 1.0, pp. 1-14.

\* cited by examiner

METHOD AND APPARATUS FOR INTEGRATED CABLE DROP COMPENSATION OF A POWER CONVERTER

RELATED APPLICATION

This application claims the benefit of U.S. Provisional Application No. 60/922,193, filed Apr. 6, 2007, entitled "Method And Apparatus For Integrated Cable Drop Compensation Of A Power Converter."

BACKGROUND INFORMATION

1. Field of the Disclosure

The present invention relates generally to power converters, and more specifically, the invention relates to voltage regulation of power converters.

2. Background

Many electrical devices such as cell phones, personal digital assistants (PDA's), laptops, etc. are powered by a source of relatively low-voltage DC power. Because power is generally delivered through a wall outlet as high-voltage AC power, a device, typically referred to as a power converter, is required to transform the high-voltage AC power to low-voltage DC power. The low-voltage DC power may be provided by the power converter directly to the device or it may be used to charge a rechargeable battery that, in turn, provides energy to the device, but which requires charging once stored energy is drained. Typically, the battery is charged with a battery charger that includes a power converter that meets constant current and constant voltage requirements required by the battery. Other electrical devices, such as DVD players, computer monitors, TVs and the like, also require a power converter for device operation. The power converter in these devices also has to provide output voltages and currents that meet the requirements of the device. In operation, a power converter may use a controller to regulate output power delivered to an electrical device, such as a battery, that may be generally referred to as a load. More specifically, the controller may be coupled to a sensor that provides feedback information of the output of the power converter in order to regulate power delivered to the load. The controller regulates power to the load by controlling a power switch to turn on and off in response to the feedback information from the sensor to transfer energy pulses to the output from a source of input power such as a power line. One particular type of power converter that may be used is a flyback power converter. In a flyback power converter, an energy transfer element may galvanically isolate the input side of the power converter from the output side. Galvanic isolation prevents DC current from flowing between the input side and the output side of the power converter, and is usually required to meet safety regulations.

Power converter control circuits may be used for a multitude of purposes and applications. There is a demand for integrating control circuit functionality that can reduce the number of components outside the integrated control circuit. This reduction in external component count enables miniaturization of the power converter to improve portability, reduces the number of design cycles required to finalize a power converter design and also improves reliability of the end product. Furthermore, reduced component count can offer energy efficiency improvements in the operation of the power converter and can reduce the power converter cost. Typically, a power converter has special circuits on the output side of the power converter to sense and to transmit feedback information about the output voltage to the control circuit that is on the input side of the power converter. One technique to reduce the number of components in the power converter is to sense the feedback information of the output voltage from the input side of the power converter instead of sensing it on the output side of the power converter. This is accomplished by a means of an indirect feedback. One challenge associated with power converters using indirect feedback is compensating for the varying voltage dropped across a cable that connects the power converter (e.g. battery charger) to the load (battery). Indirect feedback can regulate the voltage at the output of the power converter that is at one end of the cable, but the voltage the other end of the cable will be different from the voltage at the output of the power converter by the voltage drop of the cable. By compensating for the additional voltage drop of the cable, the power converter provides improved voltage regulation at the load.

There are known discrete circuits that are implemented externally to an integrated power supply controller, which can compensate for the voltage drop of the cable. However, the known discrete circuits that compensate for the voltage drop across the cable introduce additional components that increase the cost and size of the power converter. For example, known discrete cable drop compensation circuits may include relatively large capacitors that increase the size of the power converter. In addition, known discrete circuits that compensate for voltage drop across the cable may not be suitable for certain power converters using controllers that implement certain advanced control methods.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Examples related to integrated cable drop compensation circuits and methods for use in power converters are disclosed. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples. Furthermore, the particular features, structures or characteristics may be included in an integrated circuit, an electronic circuit, a combinational logic circuit, or other suitable components that provide the described functionality.

As will be discussed, example power converters in accordance with the teachings of the present invention include an integrated cable drop compensation feature that eliminates discrete components, and also extends usability to power converters for advanced control methods. One control method referred to herein is termed "on/off" control. "On/off" herein refers to whether or not the power switch is enabled to conduct. An "on" cycle is one wherein the switch is enabled, and therefore, may conduct for a portion of time during that cycle, and an "off" cycle is one wherein the switch is disabled, or prevented from conducting. Thus, "on/off" in the present disclosure does not refer to whether the switch is, in fact, conducting in a given cycle, only whether or not switch conduction is enabled. Another control method referred to as pulse width modulation herein is termed "PWM." More specifically, PWM involves modulating the on time, also referred to as the conduction time, of the switch during a cycle that may be of fixed duration or variable duration. Another form of PWM involves modulating the off time, which is when the switch is prevented from conducting, of the switch during a cycle that may be of fixed duration or variable duration. It is appreciated that modulating the on time is indistinguishable from modulating the off time when the switching cycles are of fixed duration. Examples of the disclosed power converters and methods may be used in a variety of applications in which the input side of the power converter is galvanically isolated from the output side and a load voltage is regulated in response to sensing a signal at the input side representative of the output voltage of the power converter.

Figure 1:
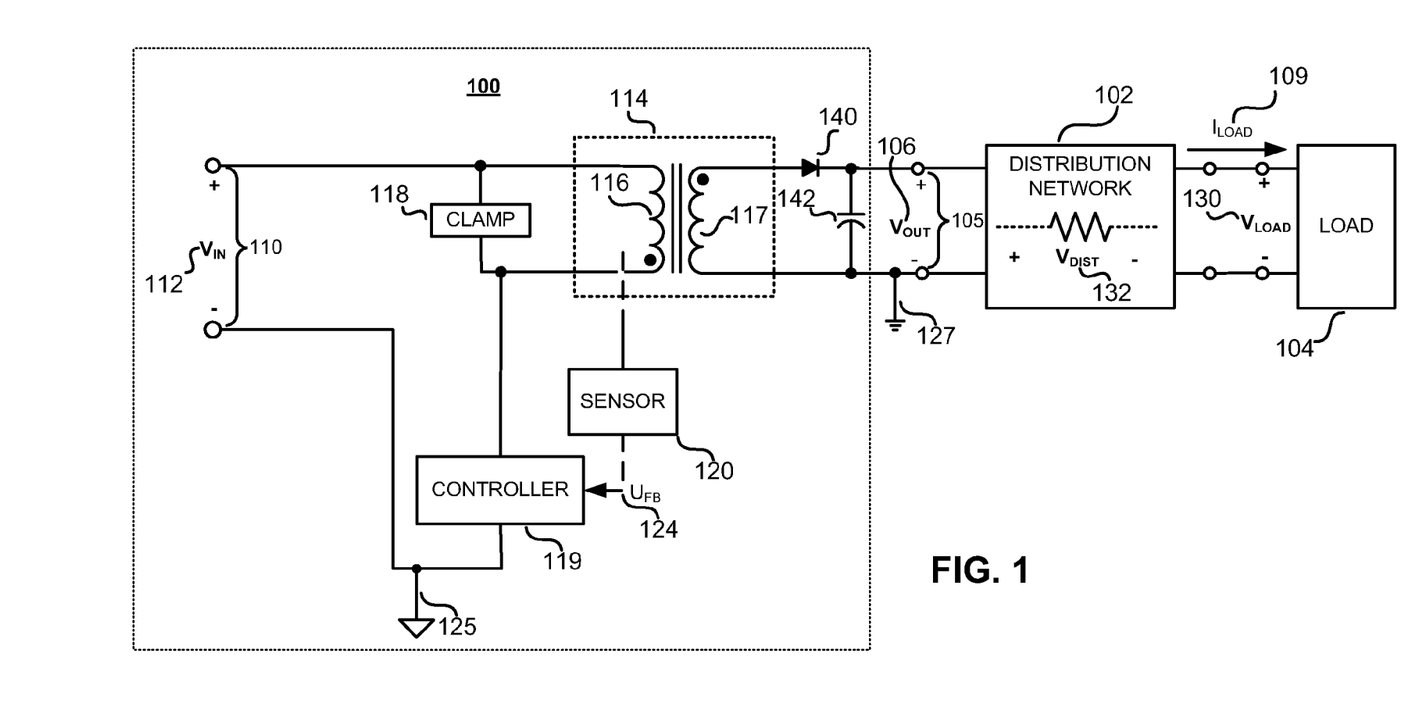
FIG. 1 is a schematic illustrating generally an example functional block diagram of a power converter coupled to a distribution network and load including an example controller in accordance with the teachings of the present invention.

To illustrate, FIG. 1 shows generally an example power converter 100 coupled to a distribution network 102 and a load 104, including an example controller in accordance with the teachings of the present invention. As shown, the distribution network 102 is coupled to an output 105 that corresponds with an output voltage $V_{OUT}$ 106. A load current $I_{LOAD}$ 109 flows from output 105 and through the distribution network 102 to supply the load 104. Typically, the distribution network 102 includes a cable, such as for example a power cord. In one example, the distribution network 102 may include, but is not limited to, terminal interfaces and/or any other elements that provide additional resistance at the output side of the power converter 100. The terminal interfaces may include for example a connection interface between the power supply and the cable as well as a connection interface between the cable and the load.

As shown, input 110 corresponds with an input voltage $V_{IN}$ 112 and is coupled to an energy transfer element 114, which in the illustrated example provides galvanic isolation between input 110 and output 105. In other words, the energy transfer element 114 prevents DC current from flowing from the input side to the output side of the power converter 100. In one example, energy transfer element 114 includes an input winding 116 and an output winding 117. An "input winding" may also be referred to as a "primary winding" and an "output winding" may also be referred to as a "secondary winding." As shown in the illustrated example, a clamp circuit 118 is coupled across input winding 116 of energy transfer element 114 to limit the voltage across a controller 119.

As shown, the controller 119 is coupled to input 110 and coupled to regulate output 105. In various examples, controller 119 may include features to employ any of a variety of switching schemes including but not limited to, on/off control, on/off control with varying current limit levels, variable or constant frequency pulse width modulation (PWM), or the like. The controller 119 is also coupled to a sensor 120 that senses a value of an output 105 of the power converter 100. In the example, output voltage $V_{OUT}$ 106 is sensed by sensor 120. As illustrated in the example, output voltage $V_{OUT}$ 106 and the sensor 120 are separated by a rectifier 140 and by the magnetic coupling between two windings 116 and 117 of an energy transfer element 114 that in the example is a transformer. The sensor 120 is coupled to output a feedback signal 124 $U_{FB}$ to the controller 119 in order to regulate output 105.

In operation, controller 119 regulates the output 105 of power converter 100 by switching a power switch included in controller 119 in response to the feedback signal 124 $U_{FB}$. When the power switch in controller 119 is on, energy from the input 110 is transferred into the input winding 116 of the energy transfer element 114 and is stored in the energy transfer element 114. When the power switch in controller 119 is off, the energy stored in the energy transfer element 114 is transferred to the output winding 117. The energy from output winding 117 is transferred to the output 105 of the power converter 100 with a pulsating current that flows through a forward biased rectifier 140 to an output capacitor 142. A substantially DC (non-pulsating) load current 109 flows from the output 105 of the power converter through a distribution network 102 to a load 104. An input return 125 is coupled to input terminals 110 and an output return 127 is coupled to output terminals 105. In one example, the input return 125 and output return 127 may be coupled.

As shown, a load current $I_{LOAD}$ 109 is delivered through the distribution network 102 to supply the load 104. In one example, the load 104 may represent a device to be charged, such as for example a cell phone battery and may require a regulated load voltage $V_{LOAD}$ 130. In operation, controller 119 produces pulsating current in the output winding 117. The current in the output winding 117 is rectified by the rectifier 140 and is filtered by output capacitor 142 to produce the substantially constant output voltage $V_{OUT}$ 106. As the load current $I_{LOAD}$ 109 increases, a distribution voltage drop $V_{DIST}$ 132 increases in proportion due to a substantially constant resistance in the distribution network 102. In one example, the power converter 100 may compensate for the distribution voltage drop $V_{DIST}$ 132 to receive better regulation at the load 104 by controlling the output voltage $V_{OUT}$ 106 in accordance with the teachings of the present invention. Since the resistance of the distribution network 102 may be different for different applications, it will be appreciated that a user must know and account for the approximate resistance of the particular distribution network in choosing appropriate feedback components in order to realize the benefits of the invention.

In one example, the power converter 100 may operate in a discontinuous conduction mode (DCM), where all energy from the energy transfer element 114 is transferred to the output winding 117 before the input winding 116 receives more energy from the input 110.

In accordance with the teachings of the present invention, the variation of load voltage $V_{LOAD}$ 130 is reduced as compared to prior power converters. This is accomplished by adjusting the output voltage $V_{OUT}$ 106 to compensate for a changing voltage drop ($V_{DIST}$ 132) across the distribution network 102. As described above, the distribution voltage drop $V_{DIST}$ 132 will change in response to the current delivered to the load 104. The invention teaches that adjusting the output voltage $V_{OUT}$ 106 to compensate for varying distribution voltage $V_{DIST}$ 132 may be accomplished in response to the switching of a power switch in the controller 119.

Figure 2A:
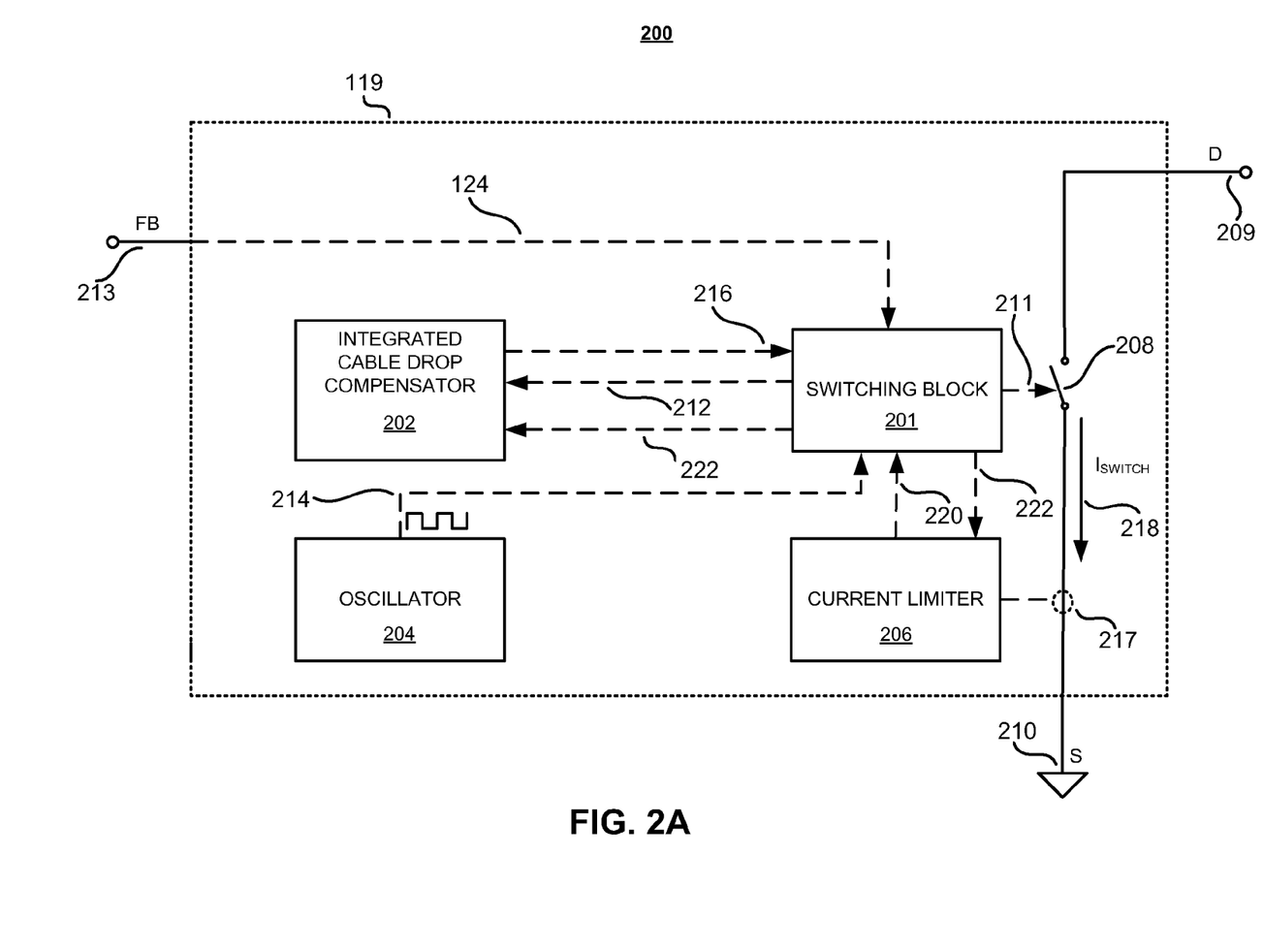
FIG. 2A is a functional block diagram further illustrating generally the example controller of FIG. 1 in accordance with the teachings of the present invention.

FIG. 2A is a functional block diagram 200 illustrating generally further aspects of an example of the controller 119 of a power converter 100 in accordance with the teachings of the present invention. As shown in the illustrated example, controller 119 further includes a power switch 208, a switching block 201, an integrated cable drop compensator 202, an oscillator 204, and a current limiter 206. In the example of FIG. 2A the controller 119 may represent the boundary of an integrated circuit that includes power switch 208, switching block 201, integrated cable drop compensator 202, and current limiter 206, in a single monolithic device. In other examples one or more of these functional blocks may be implemented with discrete circuit components, monolithic integrated circuits, hybrid integrated circuits or various combinations thereof.

In the depicted example, switching block 201 regulates output voltage 106 by switching the power switch 208 that is between a first terminal 209 and a second terminal 210. In one example, first terminal 209 may be referred to as a drain terminal and second terminal 210 may be referred to as a source terminal. In operation, the power switch 208 may be in an on state, which allows current flow through power switch 208, or in an off state, which substantially prevents current flow through the power switch 208. A drive signal 211 from switching block 201 controls the switching of the power switch 208 to regulate an output at output 105 of power converter 100. A switching signal 212 is representative of drive signal 211 and is output to cable drop compensator 202. In one example, when switching block 201 is using a constant frequency or variable frequency PWM control scheme, the switching signal 212 may represent 'on' times and 'off' times of power switch 208.

Figure 2B:
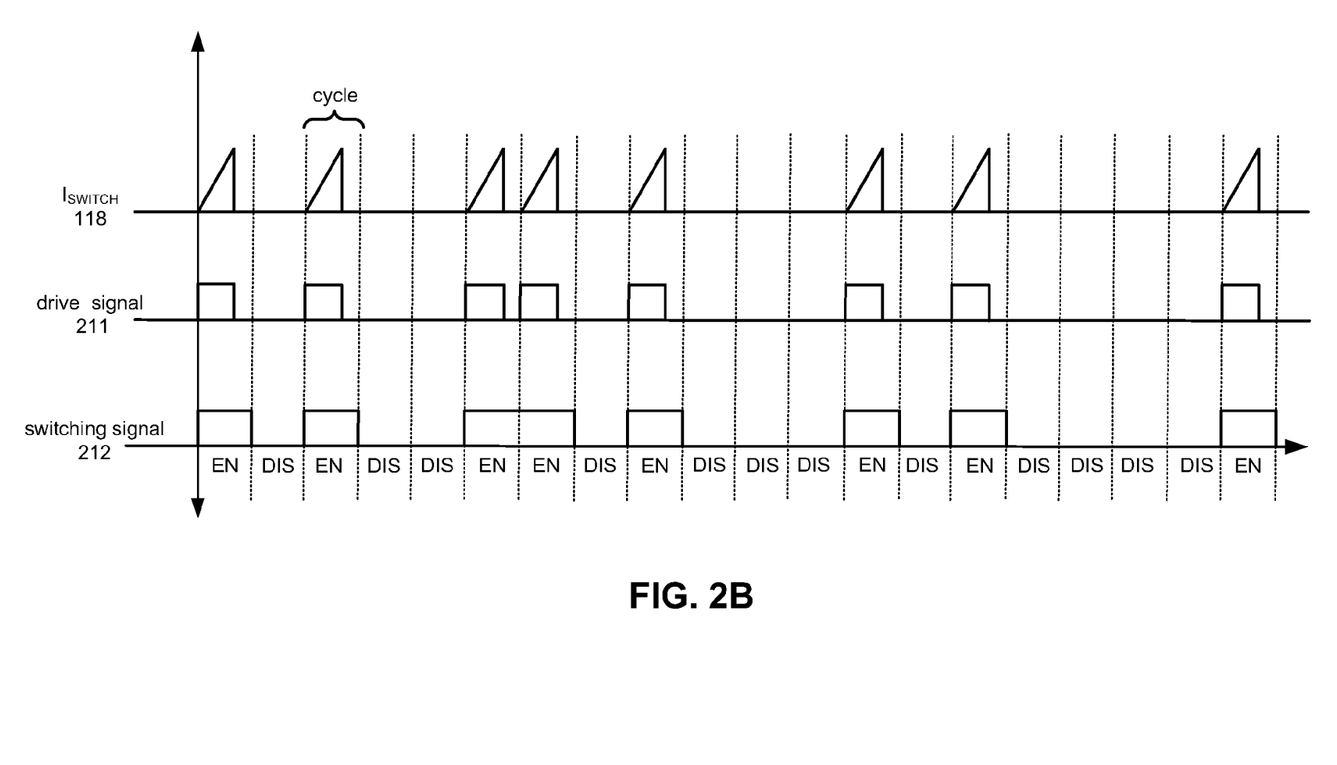
FIG. 2B illustrates generally example waveforms of signals corresponding with the example controller of FIG. 2A in accordance with the teachings of the present invention.

In another example, when switching block 201 is using an on/off control scheme, the switching signal 212 may represent 'enabled' cycles and 'disabled' cycles. In an enabled cycle, the switch may conduct, and in a disabled cycle, the switch is prevented from conducting. It is noted that "disabled cycles" may also be referred to as "skipped cycles." During an on/off control scheme, switching of the power switch 208 operates based on cycles of fixed duration as shown in FIG. 2B. Using on/off control, the switching block 201 may regulate the output voltage $V_{OUT}$ 106 by deciding to execute a switching event during a cycle or by skipping a switching event during a cycle. More specifically, a switching event is defined as when the power switch 208 transitions from an off state to an on state and back to an off state in a given cycle. The duration of the conduction time of the power switch 208 in an enabled cycle may be of a fixed duration or a variable duration and the duration may be determined any number of ways including by a timing signal of a fixed duration, a current limit, or the like. As shown in the example, when a switching event occurs, the cycle is enabled (EN) and the switching signal 212 is high for the entire duration of the cycle. When a switching event is skipped, the cycle is disabled (DIS) and the switching signal 212 is low for the duration of the cycle.

Continuing with the example shown in FIG. 2A, switching block 201 receives feedback signal 124 substantially representative of an output voltage $V_{OUT}$ 106 via a feedback terminal 213. The switching block 201 switches the power switch 208 in response to feedback signal 124. As shown, the integrated cable drop compensator 202 outputs a compensated reference voltage signal 216 that is representative of an adjusted voltage $V_{ADJ}$ which is representative of the value of output voltage $V_{OUT}$ that is required to compensate for a distribution voltage $V_{DIST}$ 132. The output voltage $V_{OUT}$ 106, which is regulated in response to the adjusted reference voltage value $V_{ADJ}$, is substantially the sum of a distribution voltage $V_{DIST}$ 132 and a load voltage $V_{LOAD}$ 130. When the load current 109 is high, a relatively high distribution voltage drop 132 will be present, and when the load current 109 is low, a relatively low distribution voltage drop 132 will be present. Therefore, improved regulation of load voltage $V_{LOAD}$ 130 is accomplished when compensated reference voltage signal 216 adjusts proportionately to load current 109 to compensate for a distribution voltage drop 132.

As shown in the depicted example, the switching block 201 receives a clock signal 214 from the oscillator 204. The clock signal 214 is a pulsating signal used as a time reference by switching block 201 for switching power switch 208. For example, in an example of on/off control, the clock signal 214 would be referenced to maintain a switching cycle of fixed duration. In an example of PWM control, the clock signal 214 would be referenced for controlling the on time or off time of the power switch 208 for each cycle.

As shown, a current limiter 206 is coupled to a current sense 217 that senses a switch current $I_{SWITCH}$ 218. In the illustrated example, current sense 217 is coupled to detect switch current $I_{SWITCH}$ 218 between power switch 208 and second terminal 210. In another example, it is appreciated that current sense 217 may be coupled to detect switch current $I_{SWITCH}$ 218 between power switch 208 and first terminal 209. The current limiter 206 outputs a current limit reached signal 220 to the switching block 201 when switch current $I_{SWITCH}$ 218 reaches a peak current limit $I_{PEAK}$. The switching block 201 may change the peak current limit $I_{PEAK}$ and output a peak current limit adjust signal $I_{ADJ}$ 222. More specifically, adjusting the peak current limit $I_{PEAK}$ may be based on or responsive to operating parameters such as, but are not limited to, mode of operation and control scheme. In one example, a maximum peak current limit $I_{MAX}$ is a value that limits the maximum value of switch current $I_{SWITCH}$ 218. In one example, peak current limit adjust signal $I_{ADJ}$ 222 is received by cable drop compensator 202 to determine a current limit ratio $K_{IRATIO}$. In one example, the current limit ratio $K_{IRATIO}$, may be used to control the switching of power switch 208. The current limit ratio $K_{IRATIO}$ may be calculated by the following equation:

$$K_{IRATIO} = \frac{I_{PEAK}}{I_{MAX}} \quad (1)$$

Figure 3A:
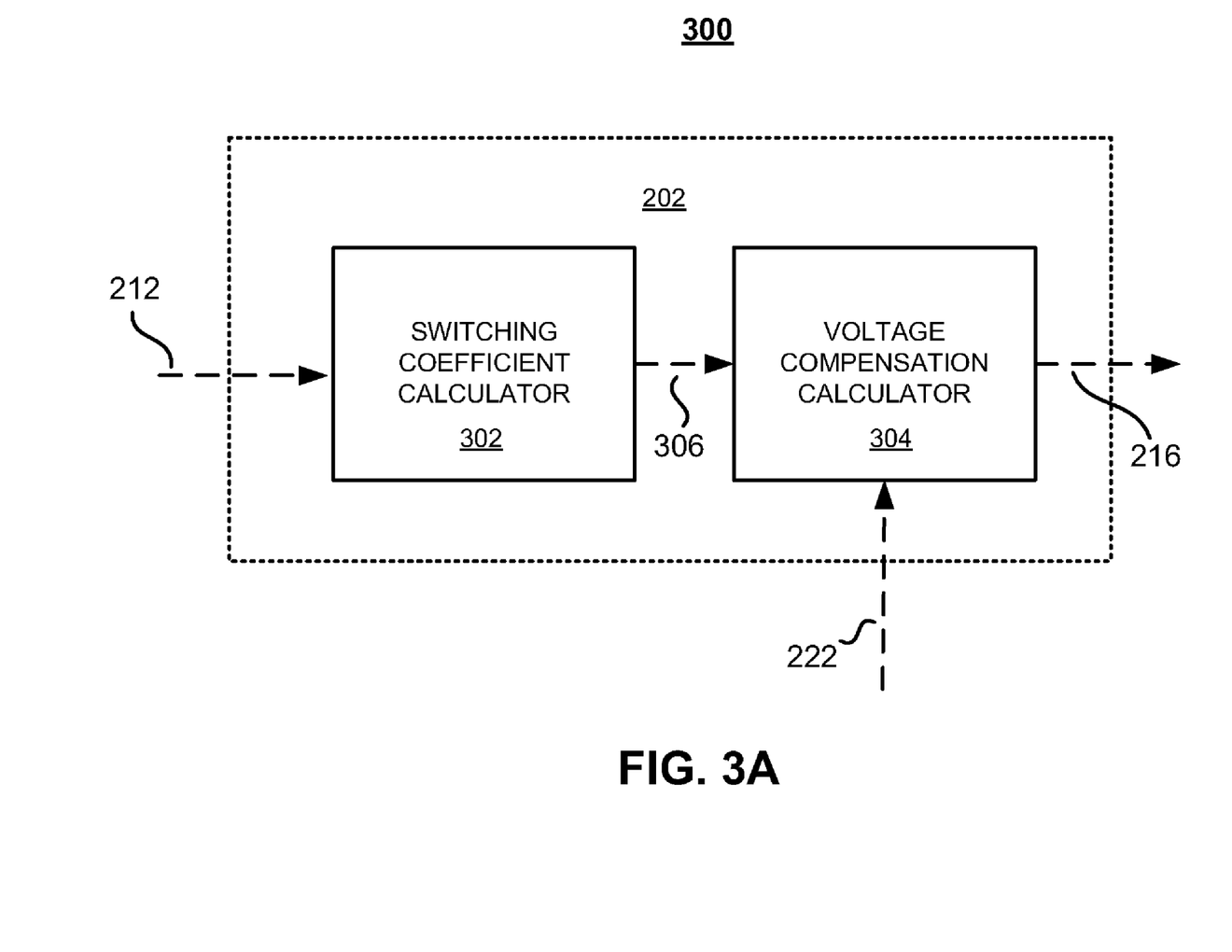
FIG. 3A is a functional block diagram further illustrating generally the example cable drop compensator of FIG. 2 in accordance with the teachings of the present invention.

FIG. 3A is a functional block diagram 300 further illustrating an example integrated cable drop compensator 202 of FIG. 2A according to the teachings of the present invention. The integrated cable drop compensator 202 includes a switching coefficient calculator 302 and a voltage compensation calculator 304. As shown, switching coefficient calculator 302 outputs a switching coefficient signal 306 representative of a switching coefficient value (SC). More specifically, the switching coefficient is representative of the switching of a power switch in a manner that is representative of the ratio of load current 109 divided by the maximum amount of deliverable load current 109. For example, when the switching coefficient SC is 1.0, then maximum load current 109 is being delivered to the load, which results in a maximum voltage drop across the distribution network 132. When switching coefficient SC is 0.5, half of maximum load current 109 is being delivered to load 104, which results in half of the maximum voltage drop across the distribution network 132.

Figure 3B:
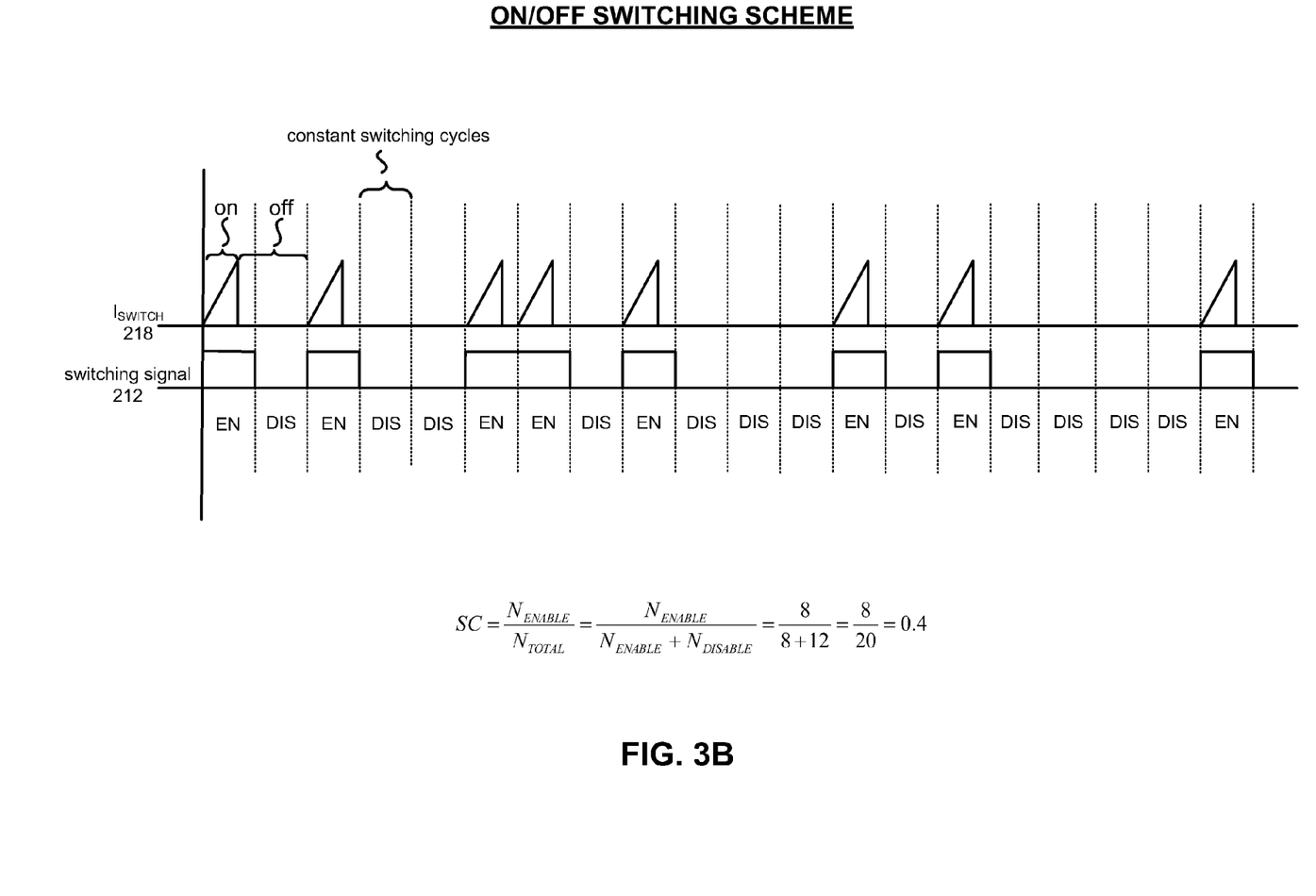
FIG. 3B illustrates generally example waveforms of signals corresponding with the example cable drop compensator of FIG. 3A in accordance with the teachings of the present invention.

FIG. 3B illustrates an example calculation of a switching coefficient SC when switching block 201 is using an on/off control scheme in accordance with the teachings of the present invention. As shown in FIG. 3B, the switching signal 212 indicates an enabled cycle (EN) when a switching event occurs during that cycle and indicates a disabled cycle (DIS) when a switching event does not take place. In an on/off control scheme, the switching coefficient SC may be calculated by determining the number of cycles the switching signal 212 is high out of a total number of cycles. In one example, the switching coefficient may be calculated with the following equation:

$$SC = \frac{N_{ENABLE}}{N_{ENABLE} + N_{DISABLE}} = \frac{N_{ENABLE}}{N_{TOTAL}} \quad (2)$$

where $N_{ENABLE}$ is defined as the number of enabled cycles and $N_{DISABLE}$ is defined as the number of disabled cycles. A total number of switching cycles $N_{TOTAL}$ is defined as the sum of enabled and disabled cycles within a set time. It will be apparent when calculating the switching coefficient in a discrete manner, the number of switching cycles to be considered must be large enough to provide a substantially constant value for the switching coefficient SC when the load current is constant, and yet must be small enough to maintain the voltage at the load within specified limits when the load current changes.

To illustrate, FIG. 3B shows an example in which the number of enabled cycles $N_{ENABLE}$ is equal to eight, the number of disabled cycles $N_{DISABLE}$ is equal to 12, and total number of cycles $N_{TOTAL}$ is equal to 20. The switching coefficient SC is determined by dividing the number of enabled cycles $N_{ENABLE}$ by the total number of cycles $N_{TOTAL}$ to get a switching coefficient SC of 0.4.

Figure 3C:
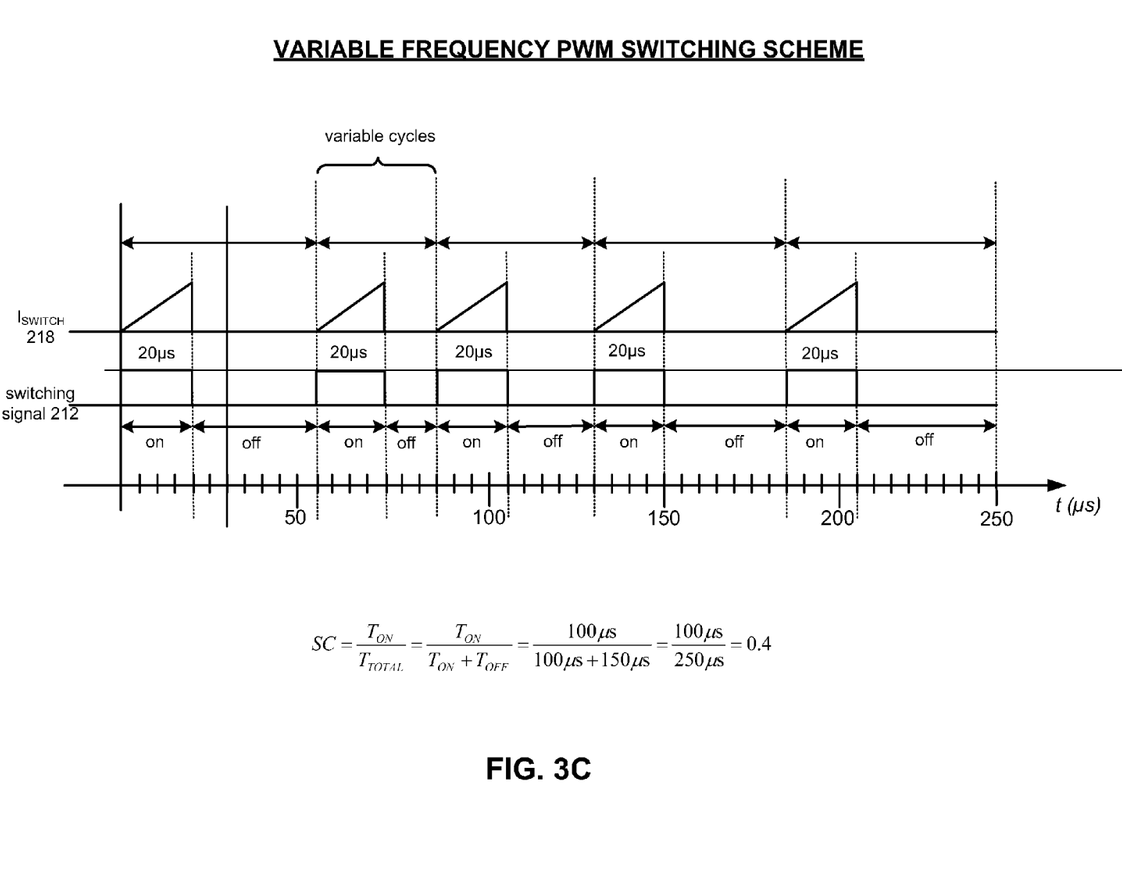
FIG. 3C illustrates generally alternate example waveforms of signals corresponding with the example cable drop compensator of FIG. 3A in accordance with the teachings of the present invention.

FIG. 3C illustrates an alternate example calculation of a switching coefficient SC with an example switching block 201 using a variable frequency pulse width modulation (PWM) control scheme in accordance with the teachings of the present invention. As shown, the switching signal 212 is a digital signal that is high when power switch 208 is in an on state, and is low when power switch 208 is in an off state. In the illustrated PWM control scheme, the switching coefficient SC may be calculated by determining the effective duty ratio of the switching signal over a period of time. More specifically, the switching coefficient may be determined with the following equation:

$$SC = \frac{t_{ON}}{t_{ON} + t_{OFF}} = \frac{t_{ON}}{t_{TOTAL}} \quad (3)$$

where $t_{ON}$ is defined as the time power switch 208 is on, which is when current is allowed to flow, and $t_{OFF}$ is defined as the time where switch remains off, within a total time $t_{TOTAL}$. As shown in the example of FIG. 3C, the on time $t_{ON}$ is equal to 100 μs, the off time $t_{OFF}$ is equal to 150 μs, and the total time $t_{TOTAL}$ is equal to 250 μs. The switching coefficient SC is calculated by dividing the on time $t_{ON}$ 100 μs by the total time $t_{TOTAL}$ 250 μs, which results in a switching coefficient SC of 0.4 in the illustrated example.

Continuing with the example cable drop compensator 202 in FIG. 3A, the voltage compensation calculator 304 outputs the compensated reference voltage signal 216 in response to switching coefficient signal 306. The switching coefficient SC is a fraction that represents the value of the load current divided by the maximum load current. Therefore, the switching coefficient signal 306 indicates the required amount of compensation as a fraction of the maximum expected distribution voltage drop $V_{DIST}$ 132. The compensated reference voltage signal 216 increases the output voltage $V_{OUT}$ 106 above its value at no load current by an amount that is substantially the same fraction of the maximum expected distribution voltage drop $V_{DIST}$ 132. Thus, the output voltage $V_{OUT}$ 106 compensates for the distribution voltage drop $V_{DIST}$ 132 that varies with the load current 109. In one example, further described with reference to FIG. 7, the switching coefficient may be calculated continuously instead of calculated in a discrete fashion as described above in FIGS. 3B and 3C in accordance with the teachings of the present invention.

Figure 4:
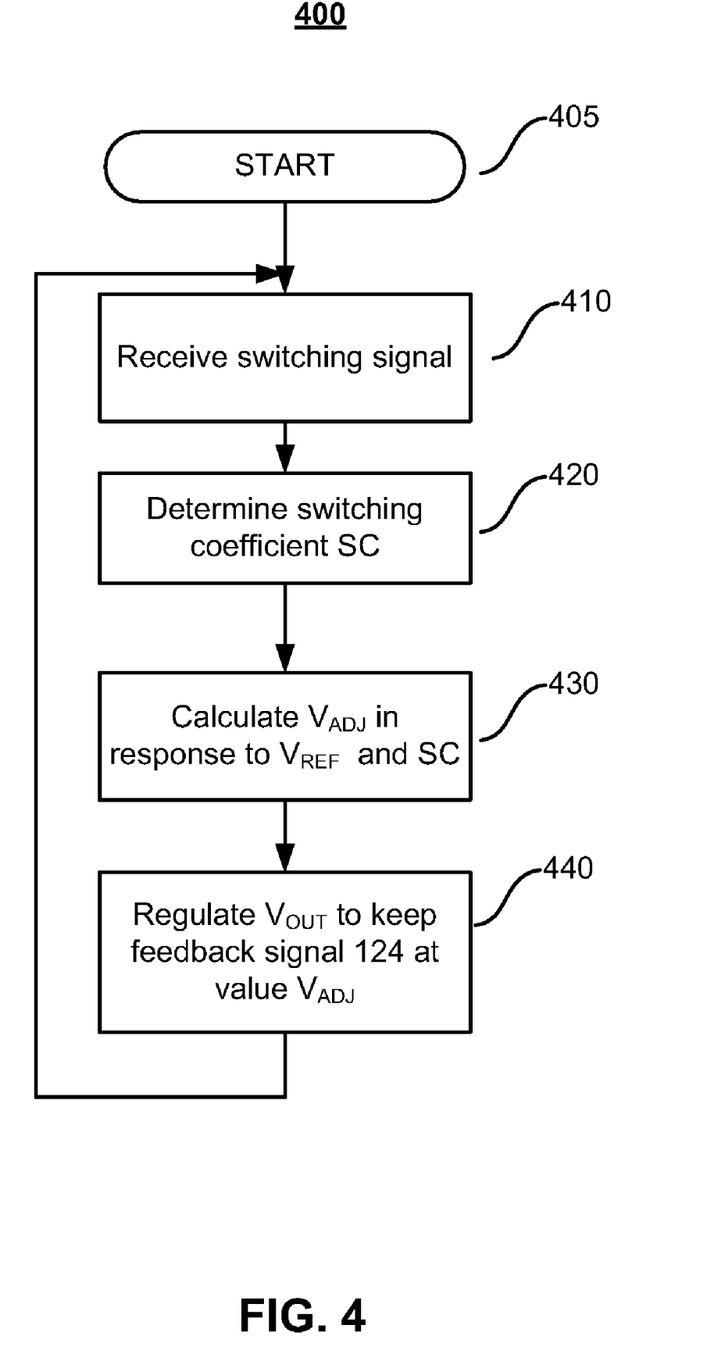
FIG. 4 is a flow chart illustrating generally an example method for cable drop compensation for a power converter in accordance with the teachings of the present invention.

FIG. 4 is a flow chart 400 illustrating generally an example method for integrated cable drop compensation in accordance with the teachings of the present invention. As shown in the illustrated example, processing begins at block 405, and in block 410, switching signal 212 is received. In block 420, a switching coefficient in response to switching signal 212 is determined. In block 430, an adjusted voltage $V_{ADJ}$ is calculated in response to the switching coefficient SC and a reference voltage $V_{REF}$. The reference voltage $V_{REF}$ is an internal voltage within the integrated circuit that remains substantially constant over a range of external conditions, and is set based on design parameters of the power converter 100. The adjusted voltage $V_{ADJ}$ is substantially the same value as $V_{REF}$ when the switching coefficient SC is zero. In block 440, output voltage $V_{OUT}$ 120 is regulated to keep the feedback signal 124 at the adjusted voltage $V_{ADJ}$ in order for $V_{OUT}$ 106 to compensate for distribution voltage $V_{DIST}$ 132 and limit the variance of load voltage $V_{LOAD}$ 130. Processing then returns to block 410.

Figure 5:
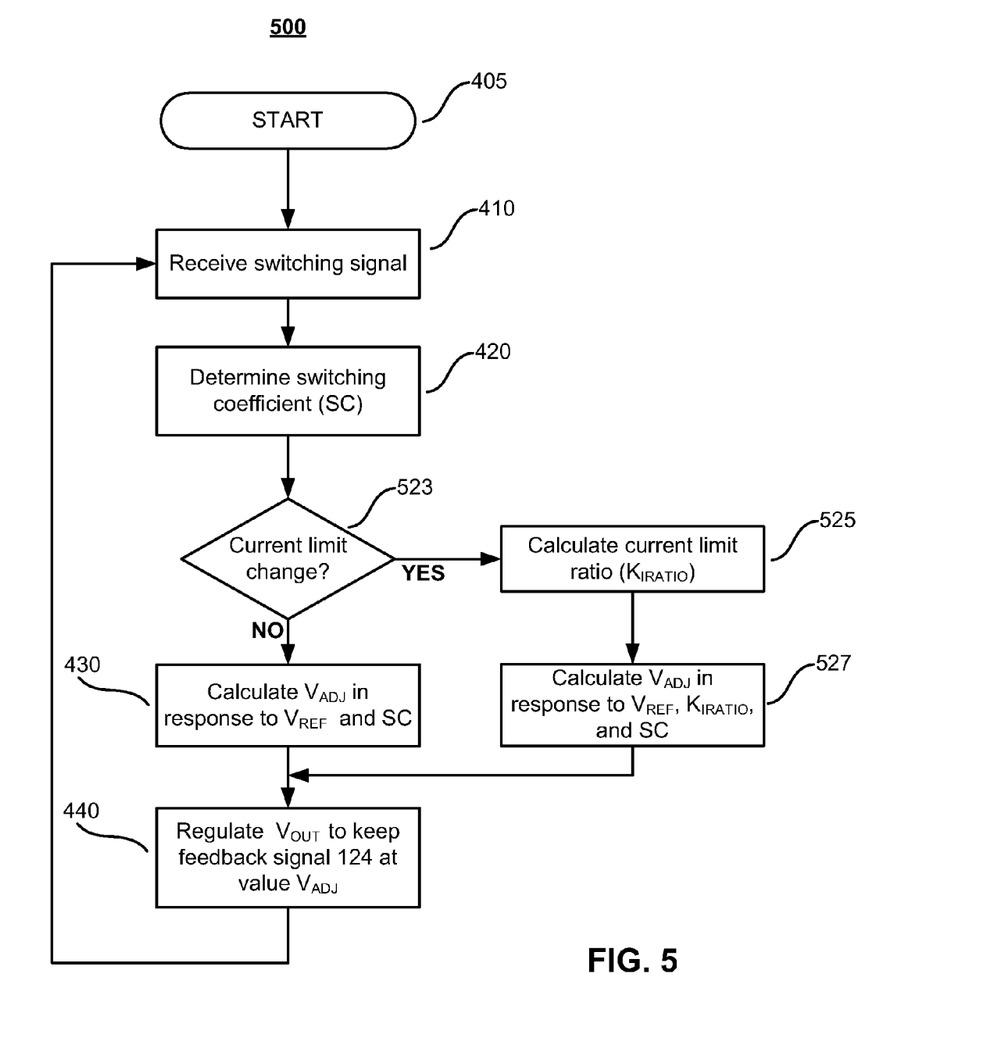
FIG. 5 is a flow chart illustrating generally an alternate example of a method for cable drop compensation for a power converter in accordance with the teachings of the present invention.

FIG. 5 is a flow chart 500 illustrating generally another example for integrated cable drop compensation in accordance with the teachings of the present invention. As shown, flow chart 500 of FIG. 5 shares some similarities with flow chart 400 of FIG. 4. For instance, processing begins in block 405. In block 410, the switching signal 212 is received. In block 420, a switching coefficient SC is determined in response to switching signal 212. However, in block 523, it is determined whether or not the current limit has changed in the present cycle from a previous cycle in response to a current adjust signal $I_{ADJ}$ 222. If it is determined in block 523 that current limit has changed, then current limit ratio $K_{IRATIO}$ is calculated in block 525 and the adjusted voltage $V_{ADJ}$ is calculated in response to reference voltage $V_{REF}$, current limit ratio $K_{IRATIO}$, and switching coefficient SC in block 527. In the discontinuous conduction mode of operation, output power is proportional to the square of the peak current limit $I_{PEAK}$. Therefore, in one example the adjusted voltage $V_{ADJ}$ may be calculated in response to the square of the current limit ratio $(K_{IRATIO})^2$.

If it is determined in block 523 that current limit has not changed, then an adjusted voltage $V_{ADJ}$ is calculated in block 430 in response to reference voltage $V_{REF}$ and switching coefficient SC. In block 440, output voltage $V_{OUT}$ 106 is regulated to keep the feedback signal 124 at the adjusted voltage $V_{ADJ}$ in order for $V_{OUT}$ 106 to compensate for distribution voltage $V_{DIST}$ 132 and limit variance of load voltage $V_{LOAD}$ 130. Processing then returns to block 410.

Figure 6:
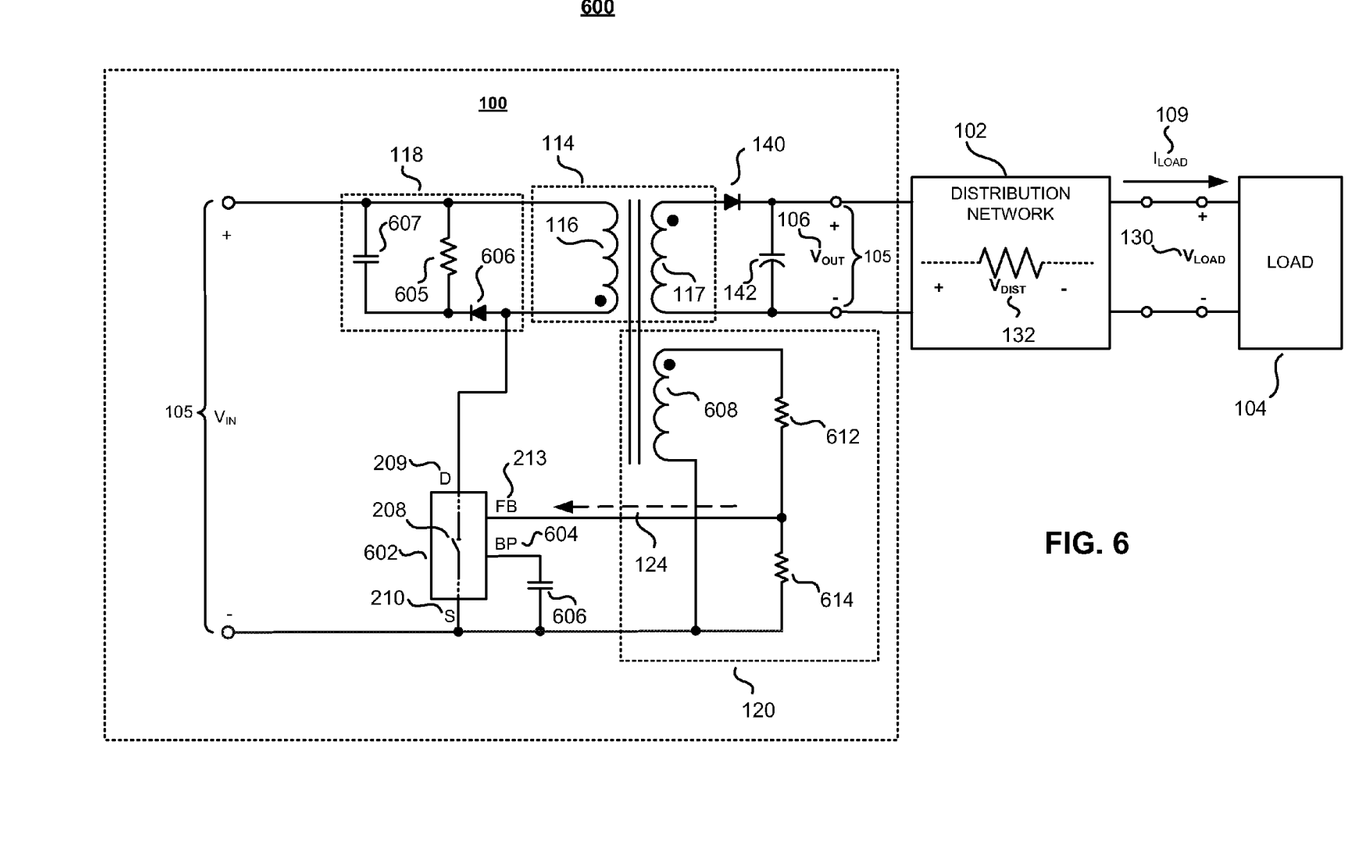
FIG. 6 is a schematic illustrating generally an example power converter coupled to a distribution network including an example controller in accordance with the teachings of the present invention.

FIG. 6 is an example schematic 600 illustrating generally a power converter 100 coupled to a distribution network 102 including an example controller in accordance with the teachings of the present invention. As shown, the energy transfer element 114 in conjunction with an integrated controller 602 is coupled to regulate output voltage $V_{OUT}$ 106 at output terminals 105 of power converter 600. In one example, integrated controller 602 implements the functions of controller 119 shown in FIG. 1. The integrated controller 602 is coupled between drain terminal 209 and source terminal 210. The feedback terminal 213 is coupled to the integrated controller 602 to receive feedback signal 124 representative of output voltage $V_{OUT}$ 106. In the illustrated example, bypass terminal 604 is coupled to a bypass capacitor 606, which provides supply current to the internal circuitry of integrated controller 602 during operation. In one example, clamp circuit 118 includes a resistor 605, a rectifier 606, and a capacitor 607 to limit maximum voltage across integrated controller 602.

In the example, FIG. 6 illustrates sensor 120 further including an auxiliary winding 608 that outputs feedback signal 124 coupled to be received by integrated controller 602. In one example, the voltage appearing across auxiliary winding 608 is substantially proportional to the output voltage $V_{OUT}$ 106 of the converter during a time after power switch 208 is turned off. In addition, auxiliary winding 608 is coupled to a voltage divider that includes first and second resistors 612 and 614 such that feedback terminal 213 is coupled between first and second resistors 612 and 614. In one example, values for first and second resistors 612 and 614 may be chosen based on the desired level of load voltage $V_{LOAD}$ 130 at a given load current, accounting for the voltage on the rectifier 140 when it is conducting. In other examples using a PWM control method, it is appreciated that the supply current for integrated controller 602 to operate may be derived from the auxiliary winding 608.

Figure 7:
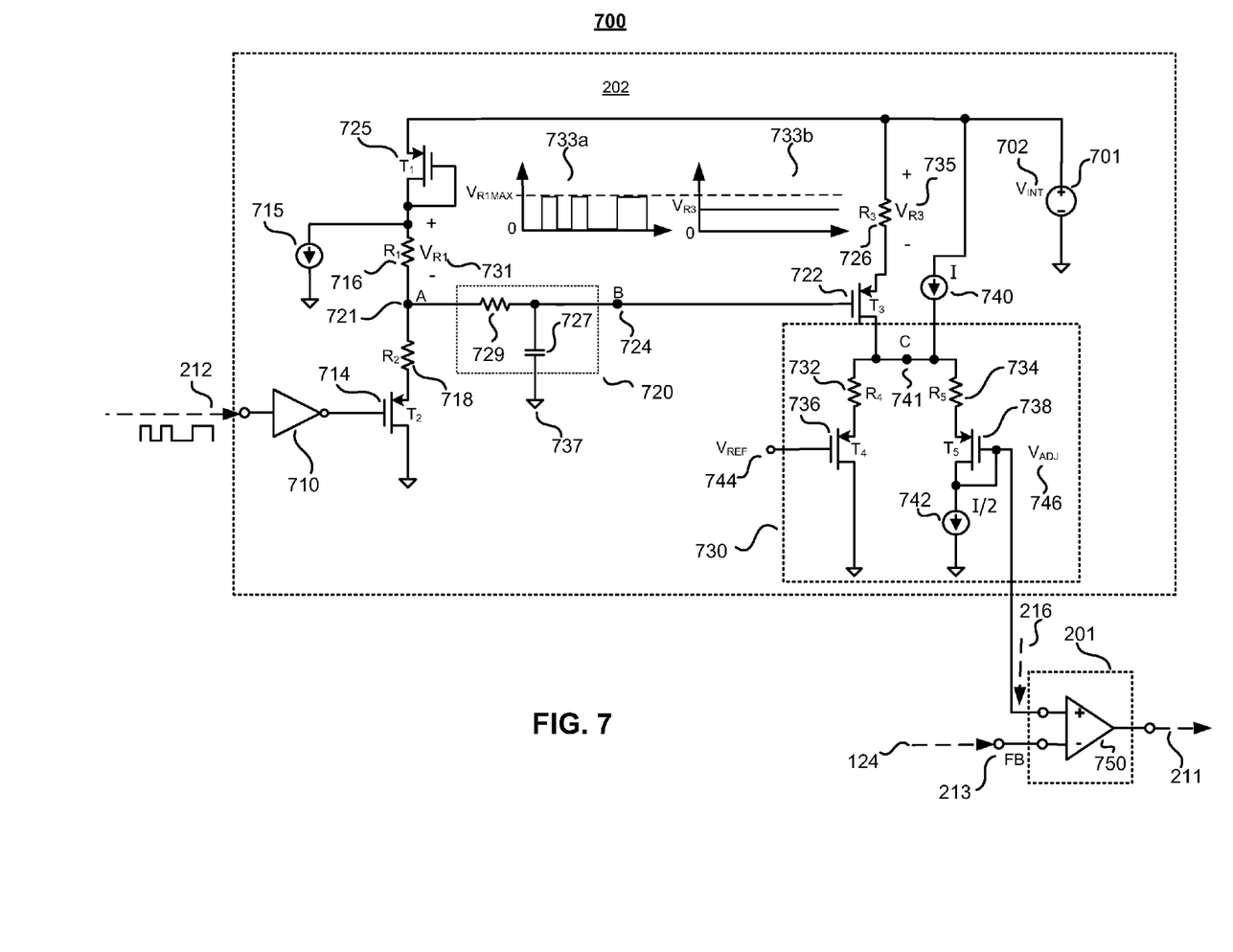
FIG. 7 is a schematic illustrating an example of an integrated cable drop compensator in accordance with the teachings of the present invention.

FIG. 7 is a schematic of a circuit 700 illustrating an example integrated cable drop compensator 202 in accordance with the teachings of the present invention. As shown, an internal voltage source 701 is coupled to supply a regulated internal voltage $V_{INT}$ 702 for circuit 700. In one example, internal regulated voltage $V_{INT}$ 702 may be supplied by the bypass capacitor 606 via bypass terminal 604, as illustrated in the example of FIG. 6.

As shown in the depicted example, a switching signal 212, which is representative of drive signal 211, is received by an inverter 710. In one example, switching signal 212 may be a digital signal that is active during the duration of an enabled cycle and inactive otherwise. In one example, a logical high digital signal represents an active signal and a logical low signal represents an inactive signal. When switching signal 212 is high, the gate of a transistor $T_2$ 714 will be low allowing current to flow through resistor $R_1$ 716 and resistor $R_2$ 718. When switching signal 212 is low, the gate of transistor $T_2$ 714 will be high preventing current flow through transistor $T_2$ 714 and $R_2$ 718.

In the illustrated example, a current source 715 is coupled to a transistor $T_1$ 725 to sink current from the internal voltage supply 701. As shown, a low pass filter 720 is coupled to a node A 721, a node B 724 which is coupled to the gate of a transistor $T_3$ 722, and a common return 737. In one example, the low pass filter includes a capacitor 727 and a resistor 729 coupled as shown. In operation, when the gate of transistor $T_2$ 714 is high, a voltage drop $V_{R1}$ 731 across resistor $R_1$ 716 is substantially zero due to a relatively high resistance of resistor 729 with respect to the resistance of resistor $R_1$ 716.

As shown, a first graph 733a illustrates an AC voltage waveform representative of a voltage drop $V_{R1}$ 731. More specifically, the voltage drop with a magnitude of $V_{R1MAX}$ is dropped across resistor $R_1$ 716 when gate of transistor $T_2$ 714 is low and a voltage drop of substantially zero volts is dropped across resistor $R_1$ 716 when gate of transistor $T_2$ 714 is high. A second graph 733b illustrates a DC voltage waveform representative of voltage drop $V_{R3}$ 735 across a resistor $R_3$ 726. More specifically, the voltage drop $V_{R3}$ is a continuously averaged value of AC voltage drop $V_{R1}$ 731. In other words, low pass filter 720 is coupled to provide a substantially DC voltage $V_{R3}$ 735 across resistor $R_3$ 726 from a time-varying voltage $V_{R1}$ 731. Transistors 725 and 722 are sized to operate at low current density. Consequently, the voltage between gate and source of transistor 725 is approximately the same as the voltage between gate and source of transistor 722. Therefore, in the example shown, low pass filter 720 effectively functions as the switching coefficient calculator 302. In one example, $V_{R1}$ has the value $V_{R1MAX}$ when the switching signal 212 is high, and $V_{R1}$ is substantially zero when the switching signal 212 is low or in the "disabled state." Therefore, the average voltage $V_{R3}$ in N switching cycles is $V_{R1MAX}$ divided by N and multiplied by the number of enabled cycles in the N switching cycles.

As shown, a voltage compensation calculator 730 includes matched resistors $R_4$ 732 and $R_5$ 734 coupled with matched in size transistors $T_4$ 736 and $T_5$ 738, respectively. A current source 740, coupled to internal voltage supply $V_{INT}$ 702, supplies current I to the voltage compensation calculator 730. In the illustrated example, a second current source 742 is coupled to common return 737 and conducts half of the current of current source 740.

In one example, when almost all cycles are disabled, the switching coefficient is substantially equal to zero and current through transistor $T_3$ 722 is substantially equal to zero. Furthermore, the current through a transistor $T_4$ 736 and a resistor $R_4$ 732 will be the same as current through a transistor $T_5$ 738 and resistor a $R_5$ 734. Therefore, an adjusted voltage $V_{ADJ}$ 746 will be substantially the same value as a fixed reference voltage $V_{REF}$ 744.

In another example, the switching coefficient SC is 0.5 or 50%, which for example may indicate that power switch 208 is enabled for 50% of a set number of cycles. During the time when the switching signal 212 is low, substantially no current flows through resistors $R_1$ 716 and $R_2$ 718. Conversely, when switching signal 212 is high, current flows through resistors $R_1$ 716 and $R_2$ 718, and there will be a voltage drop across resistor 716. The voltage drop may be determined by the following equation:

$$V_{R1} = \left(\frac{R_1}{R_1 + R_2}\right) \times (V_{INT} - V_{GS1} - V_{GS2}) \quad (4)$$

where $V_{R1}$ is the voltage drop across resistor $R_1$, $V_{INT}$ 702 is the internal supply voltage 702, $V_{GS1}$ is the gate to source voltage associated with transistor 725, and $V_{GS2}$ is the drain to source voltage associated with transistor 714.

In operation, the voltage at a node C 741 with respect to common return 737 adjusts in response to the additional current flowing through resistor $R_3$ 726 and resistor $R_4$ 732. More specifically, when current flow increases through resistor $R_3$ 726 the voltage drop across resistor $R_4$ increases which raises the voltage at node C 741 with respect to common reference 737. When current flow decreases through $R_3$ 726 the voltage drop across resistor $R_4$ decreases which reduces the voltage at node C 741 with respect to common reference 737. Since the voltage across resistor $R_5$ 734 is held constant by current source 742, and the voltage at node C 741 is changing, the adjusted voltage $V_{ADJ}$ 746 changes by the same amount as the voltage at node C. According to this implementation, adjusted voltage $V_{ADJ}$ 746 may be representative of the following equation:

$$V_{ADJ} = V_{REF} + V_{R4} - V_{R5} \quad (5)$$

where $V_{R4}$ is the voltage drop across resistor $R_4$ 732 and $V_{R5}$ is a fixed voltage drop across resistor $R_5$ 735, $V_{REF}$ 744 is a set reference voltage with respect to common return 737.

In one example, a comparator 750 included in the switching block 201 receives the compensated reference voltage signal 216 representative of adjusted voltage $V_{ADJ}$ 746 and compares it to feedback signal 124 representative of output voltage $V_{OUT}$ 106 to regulate output voltage $V_{OUT}$ 106 to compensate for a changing distribution voltage $V_{DIST}$ 132 to maintain limited variance of load voltage $V_{LOAD}$ 130.

Figure 8:
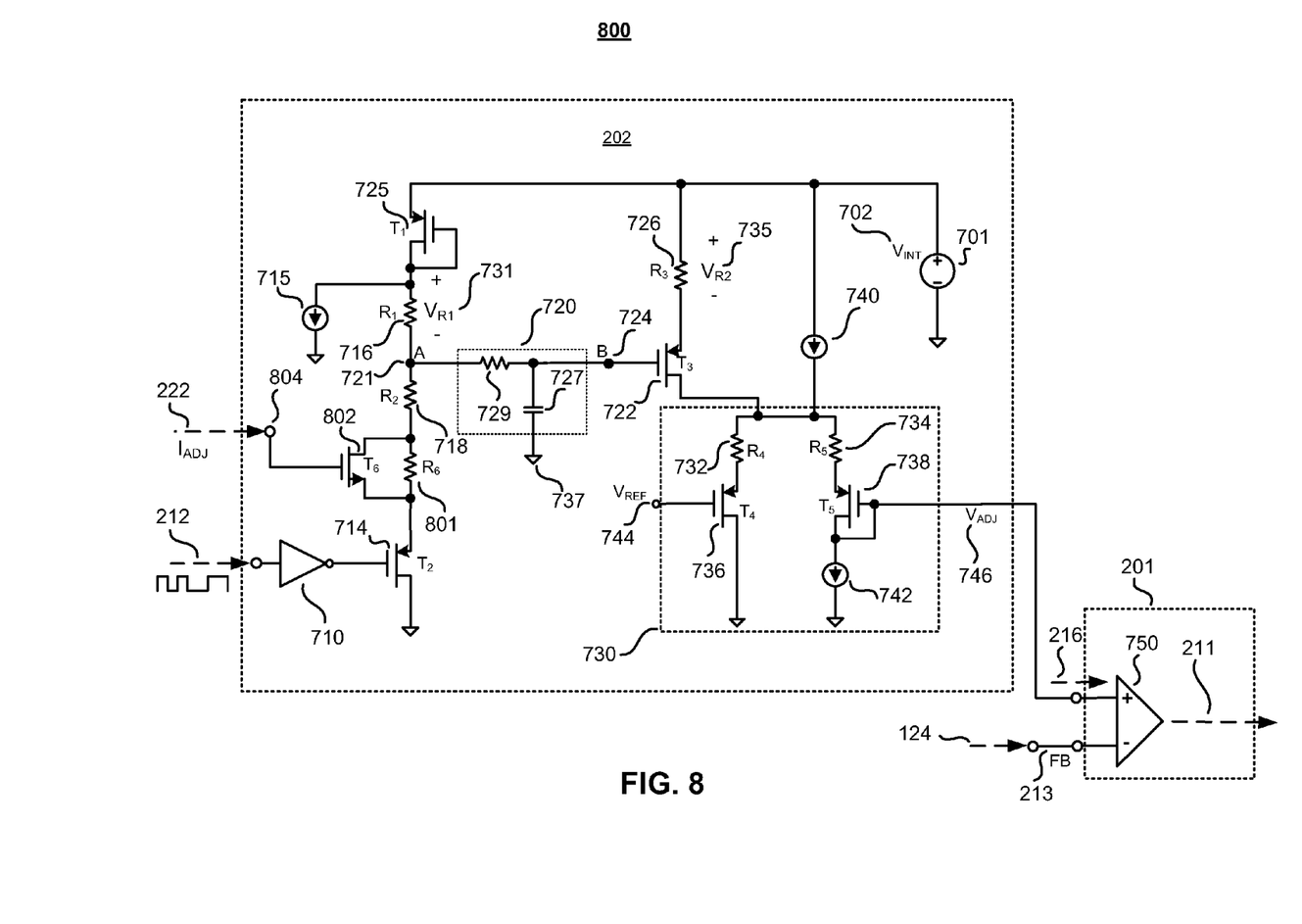
FIG. 8 is a schematic illustrating an alternative example of an integrated cable drop compensator that accommodates for varying current limits in accordance with the teachings of the present invention.

FIG. 8 is a schematic illustrating a modified example of an integrated cable drop compensator in FIG. 7 that accommodates for varying peak current limits in accordance with the teachings of the present invention. As shown, a resistor $R_6$ 801 and a transistor $T_6$ 802 are included and are coupled to allow more than one current limit. In the illustrated example, the current adjust signal $I_{ADJ}$ 222 is received by cable drop compensator 202 via a current limit terminal 804. In one example, the current adjust signal $I_{ADJ}$ 222 may be an analog signal to accommodate multiple current limit levels. In another example, multiple signals may designate multiple current limit levels through the use of multiple resistors between resistor $R_2$ 718 and $R_6$ 801, each additional resistor to be shorted by a transistor that receives a current adjust signal, such that either the transistor or the resistor conducts the current in resistor $R_2$ 718. According to the example illustrated in FIG. 8, current adjust signal $I_{ADJ}$ 222 is a digital signal that that turns transistor 802 between an 'off' state and an 'on' state. More specifically, when current adjust signal $I_{ADJ}$ 222 is high, resistor $R_6$ is shorted and the current limit is at the maximum peak current limit $I_{MAX}$. The voltage across resistor $R_1$ 716 can be calculated the same way as discussed with respect to FIG. 7 using Equation (4) above.

When current adjust signal $I_{ADJ}$ 222 is low, present peak current limit $I_{PEAK}$ is reduced from maximum peak current limit $I_{MAX}$ and transistor 802 is 'off' resulting in a reduced voltage drop across resistor $R_1$. The voltage across resistor 716 $R_1$ may be calculated based on the following equation:

$$V_{R1} = \left(\frac{R_1}{R_1 + R_2 + R_6}\right) \times (V_{INT} - V_{GS1} - V_{GS2}) \quad (6)$$

where $V_{R1}$ is the voltage drop across resistor $R_1$ 716, $V_{INT}$ is the internal supply voltage 702, $V_{GS1}$ is the gate to source voltage associated with transistor $T_1$ and $V_{GS2}$ is the drain to source voltage associated with transistor $T_2$. As shown in the equation above, voltage drop $V_{R1}$ 731 decreases due to the additional resistance of resistor $R_6$ 801. More specifically, the $V_{R1}$ 731 is decreased in proportion to the decrease in peak current limit $I_{PEAK}$ from the max peak current limit $I_{MAX}$. Therefore, the adjusted voltage $V_{ADJ}$ 746 will be limited by the same proportion the $V_{R1}$ value in Equation (6) has been reduced from the $V_{R1}$ value in Equation (4). In one example, multiple peak current limits may be added and implemented using the principles explained above in accordance with the teachings of the present invention.

In the foregoing detailed description, the method and apparatus of the present invention have been described with reference to specific examples or embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An integrated circuit controller for a power converter to provide power to a load through a distribution network, the integrated circuit controller comprising:
    a switching control circuit that outputs a drive signal to control switching of a switch to regulate an output of the power converter, wherein the switching control circuit further outputs a switching signal that is representative of the drive signal; and
    a cable drop compensator coupled to receive the switching signal from the switching control circuit and to output a compensated reference voltage signal to the switching control circuit in response to the switching signal, wherein the switching control circuit outputs the drive signal to control the switching of the switch responsive to the compensated reference voltage signal and a feedback signal, wherein the cable drop compensator adjusts the compensated reference voltage signal to compensate for a distribution voltage drop across the distribution network.

2. The integrated circuit controller of claim 1 further comprising a current limiter coupled to the switching control circuit, wherein the current limiter is configured to output a current limit reached signal in response to a switch current to flow through the power switch, the switching control circuit configured to output the drive signal in response to the current limit reached signal.

3. The integrated circuit controller of claim 1 further comprising an oscillator configured to output a clock signal coupled to be received by the switching control circuit, the switching control circuit configured to output the drive signal in response to the clock signal.

4. The integrated circuit controller of claim 1 wherein the cable drop compensator comprises:
    a switching coefficient calculator configured to output a switching coefficient signal in response to the switching signal from the switching control circuit; and a voltage compensation calculator configured to output the compensated reference voltage signal in response to the switching coefficient signal.

5. The integrated circuit controller of claim 4 wherein the switching coefficient calculator comprises a low pass filter configured to generate the switching coefficient signal.

6. The integrated circuit controller of claim 4 wherein the voltage compensation calculator is configured to output the compensated reference voltage signal further in response to a peak current limit adjust signal.

7. The integrated circuit controller of claim 4 wherein the voltage compensation calculator is configured to output the compensated reference voltage signal further in response to a reference voltage.

8. The integrated circuit controller of claim 1 wherein the switching control circuit and the cable drop compensator are included in a single monolithic device.

9. The integrated circuit controller of claim 8 wherein the single monolithic device further includes the switch.

10. The integrated circuit controller of claim 1 wherein the compensated reference voltage signal is responsive to a sum of the distribution voltage across the distribution network and the load voltage across the load to be coupled to the distribution network.

11. A method for controlling a power converter, comprising:
generating a drive signal with a switching control circuit to control switching of a switch to transfer energy from an input of the power converter to an output of the power converter;
generating a switching signal with the switching control circuit that is representative of the drive signal;
outputting the switching signal to a cable drop compensator coupled to the switching control circuit;
generating a switching coefficient with the cable drop compensator in response to the switching signal;
generating a compensated reference voltage signal in response to a reference voltage and the switching coefficient to compensate for a distribution voltage across the distribution network coupled to the output of the power converter and a load voltage across a load coupled to the distribution network; and
controlling the switching of the switch in response to the compensated reference voltage and a feedback signal.

12. The method for controlling the power converter of claim 11 wherein generating the compensated reference voltage signal further includes comprising:
varying a peak current limit of the switch;
calculating a current limit ratio of the switch; and
generating the compensated reference voltage signal further in response to the current limit ratio, the reference voltage and the switching coefficient.

13. The method for controlling the power converter of claim 12 wherein the current limit ratio of the switch is calculated in response to the peak current limit and a maximum peak current limit of the switch.

14. The method for controlling the power converter of claim 11 further comprising galvanically isolating the input of the power converter from the output of the power converter.

15. The method for controlling the power converter of claim 11 further comprising generating the feedback signal in response to sensing a voltage across an auxiliary winding of an energy transfer element of the power converter.

16. A power converter for providing power to a load through a distribution network, the power converter comprising:
an energy transfer element having an input and an output;
a sensor coupled to the energy transfer element to generate a feedback signal in response to an output of the power converter;
a switching control circuit that outputs a drive signal to control switching of a switch coupled to the energy transfer element to regulate an output of a power converter, wherein the switching control circuit further outputs a switching signal that is representative of the drive signal; and
a cable drop compensator coupled to receive the switching signal from the switching control circuit and to output a compensated reference voltage signal to the switching control circuit in response to the switching signal, wherein the switching control circuit outputs the drive signal to control the switching of the switch responsive to the compensated reference voltage signal and a feedback signal, wherein the cable drop compensator adjusts the compensated reference voltage signal to compensate for a distribution voltage drop across the distribution network.

17. The power converter of claim 16 further comprising a current limiter coupled to the switching control circuit, wherein the current limiter is configured to output a current limit reached signal in response to a switch current through the power switch, the switching control circuit configured to output the drive signal in response to the current limit reached signal.

18. The power converter of claim 16 wherein the cable drop compensator comprises:
a switching coefficient calculator configured to output a switching coefficient signal in response to the switching signal from the switching control circuit; and
a voltage compensation calculator configured to output the compensated reference voltage signal in response to the switching coefficient signal.

19. The power converter of claim 18 wherein the voltage compensation calculator is configured to output the compensated reference voltage signal further in response to a reference voltage.

* * * * *